United States Patent [19]

Kohari et al.

[11] Patent Number: 5,049,800
[45] Date of Patent: Sep. 17, 1991

[54] MOTOR OUTPUT CHANGEOVER CONTROL APPARATUS

[75] Inventors: Katsuo Kohari, Tachikawa; Kosei Nakamura, Yamanashi; Yoshiki Fujioka, Yamanashi; Shinichi Kono, Yamanashi; Tatsuo Shinohara, Yamanashi, all of Japan

[73] Assignee: Fanuc Ltd., Minamitsuru, Japan

[21] Appl. No.: 415,248

[22] PCT Filed: Feb. 20, 1989

[86] PCT No.: PCT/JP89/00167
§ 371 Date: Sep. 11, 1989
§ 102(e) Date: Sep. 11, 1989

[87] PCT Pub. No.: WO89/07858
PCT Pub. Date: Aug. 24, 1989

[30] Foreign Application Priority Data

Feb. 22, 1988 [JP] Japan ............... 63-039054

[51] Int. Cl.$^5$ .................................. H02P 1/26
[52] U.S. Cl. ........................ 318/771; 318/772; 318/778; 318/729
[58] Field of Search ................. 318/702-820

[56] References Cited

U.S. PATENT DOCUMENTS

| | | | |
|---|---|---|---|
| 3,611,082 | 10/1971 | Schmitz | 318/771 X |
| 3,624,471 | 11/1971 | Tapp | 318/771 |
| 3,860,093 | 1/1975 | Mitsui et al. | 318/771 X |
| 4,384,243 | 5/1983 | Muskovac | 318/729 |
| 4,413,218 | 11/1983 | Taylor et al. | 318/771 |
| 4,425,539 | 1/1984 | Wills | 318/771 |
| 4,446,415 | 5/1984 | Taylor et al. | 318/771 X |
| 4,477,760 | 10/1984 | Kuznetsov | 318/771 X |
| 4,691,155 | 9/1987 | Taylor et al. | 318/771 |
| 4,712,054 | 12/1987 | Boldt | 318/763 X |
| 4,736,147 | 4/1988 | Shizhang | 318/778 |

Primary Examiner—Paul Ip
Attorney, Agent, or Firm—Staas & Halsey

[57] ABSTRACT

The invention relates to a motor output changeover control apparatus used for the spindle motor of machine tools. Conventionally, since a constant output over a wide range is realized by gears, a spindle motor is constituted by a single winding. The amount of heat produced by the winding is great, and a speed-change mechanism employing the gears is large in size.

With the motor output changeover control apparatus of the invention, output characteristics over a wide range from high to low speeds is stabilized by changing over the connection of the power lines of an AC motor.

14 Claims, 3 Drawing Sheets

MOTOR OUTPUT CHANGEOVER CONTROL APPARATUS

DESCRIPTION

1. Technical Field

This invention relates to a motor output changeover control apparatus used for the spindle motor of machine tools.

2. Background Art

The spindle motor of an ordinary machine tool comes equipped with a gear mechanism for the purpose of assuring a constant output over a wide range of speeds. By changing the rotational speed of the spindle connected to the spindle motor, a wide variety of cutting conditions can be realized using the machine tool.

A conventional spindle speed change mechanism for realizing a constant output over a wide range by gears uses a spindle motor having a single winding. As a consequence, the winding produces a large amount of heat and the speed change mechanism using gears is elaborate. In addition, the motor itself must have a large capacity.

DISCLOSURE OF THE INVENTION

The present invention solve the foregoing problems. An object of the present invention is to provide a motor output changeover control apparatus capable of obtaining a constant output of a spindle motor over a wide range by an AC motor having a low-speed winding and a high speed winding.

In accordance with the present invention, there is provided a motor output changeover control apparatus for an AC motor having a low-speed winding and a high-speed winding, the apparatus comprising winding changeover means for changing over a power line connection of the AC motor, and command means for issuing a power line changeover command to the winding changeover means based on a changeover request.

Thus, the winding changeover control apparatus of the invention is capable of stabilizing output characteristics over a wide range from high to low speed by changing over the power line connection of the AC motor. Moreover, since obtaining the constant output over a wide range can be realized by a single winding, it is possible to construct a spindle motor for a small-size machine tool. Thus there is provided a motor output changeover control apparatus which is very effective.

DESCRIPTION OF THE PREFERRED EMBODIMENT AND BEST MODE FOR CARRYING OUT THE INVENTION

An embodiment of the present invention will now be described in detail with reference to the drawings.

Figure 1:
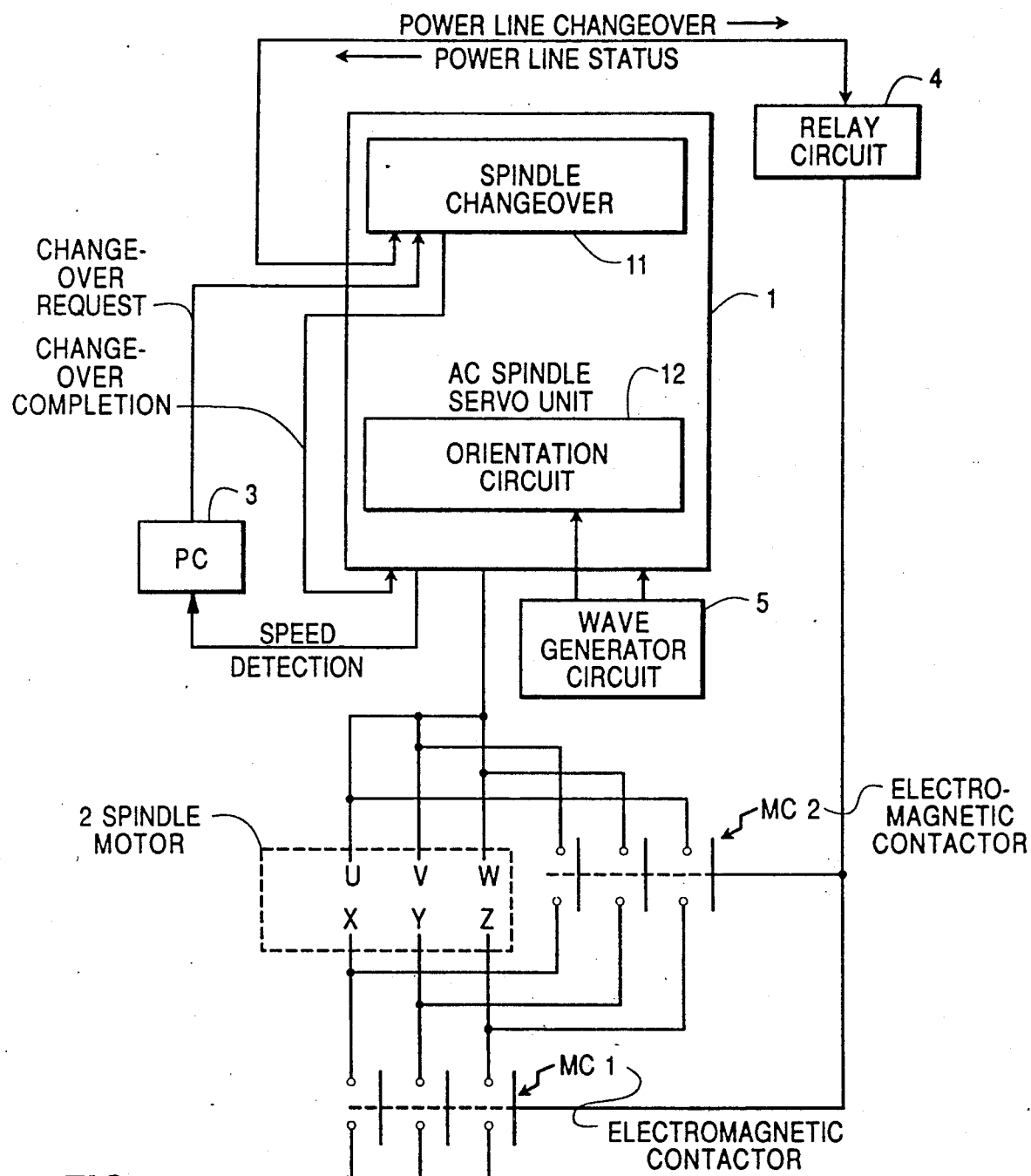
FIG. 1 is a block diagram illustrating an embodiment of the present invention.

FIG. 1 is a block diagram illustrating an example of output changeover control of a motor performed by an AC spindle servo unit 1. A spindle motor 2 has its speed digitally controlled by a current signal pulse-width modulated by a transistorized inverter within the spindle servo unit. 1. The spindle servo unit 1 includes a spindle changeover circuit 11. The spindle motor 2 is an AC motor having a low-speed winding and a high-speed winding, and the arrangement is such that winding changeover is possible by changing over the connections between terminals U, V, W and X, Y, Z of the power lines.

Numeral 3 denotes a programmable controller which outputs a changeover request signal to the spindle changeover circuit 11 in response to a speed detection signal, indicative of the speed of spindle motor 2, detected by the spindle servo unit 1. The arrangement is such that the programmable controller 3 forms the abovementioned changeover request signal in dependence upon changeover speed. The spindle changeover circuit 11 issues a power line changeover command to a relay circuit 4 based on the changeover request signal, and a command for changing over a ROM from a main ROM to a subordinate ROM. The power line changeover command is for alternately turning on and off electromagnetic contacts MC1, MC2 for winding changeover of the spindle motor 2.

Figure 2A:
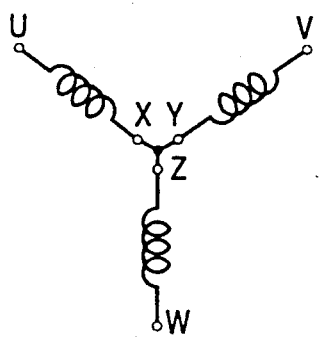
FIGS. 2(a) and (b) are views illustrating the winding arrangements of Y- and delta-connections of the winding of a spindle motor armature.
Figure 2B:
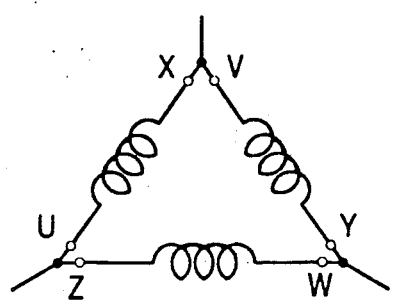

FIGS. 2(a) and (b) illustrate a case in which the armature winding of the spindle motor 2 is arranged in a Y connection as a low-speed winding, and in a delta-connection as a high-speed winding, respectively. In other words, when the electromagnetic contact MC1 is turned on, the winding arrangement becomes Y-connected and the motor has a constant output characteristic in a region of low rotational speed. When the electromagnetic contact MC2 is turned on, the winding arrangement becomes delta-connected and the motor has constant output characteristic in a region of high rotational speeds.

Figure 3:
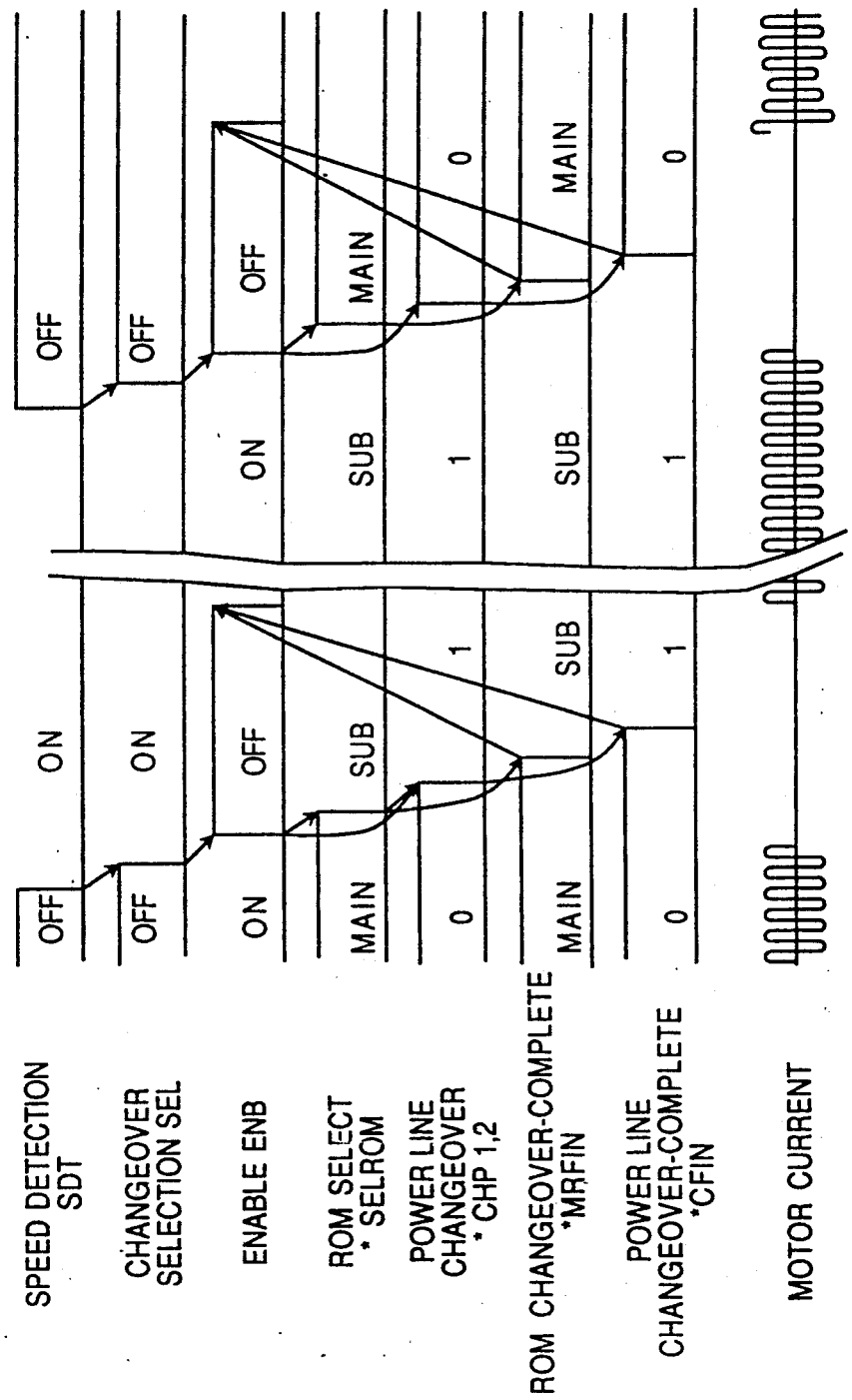
FIG. 3 is a view illustrating an example of a winding changeover sequence.

FIG. 3 illustrates an example of a winding changeover sequence performed by the AC spindle servo unit 1. When the speed of the spindle motor 2 exceeds a set speed so that the speed detection signal SDT changes over from off to on, the changeover request command SEL from the PC 3 turns on. When this signal enters the spindle changeover circuit 11, an enable signal ENB turns off. As a result, motor current is cut off and, on the basis of a ROM selection command *SELROM, the spindle changeover circuit 11 commands a changeover from the main ROM to the subordinate ROM. At the same time, power line changeover commands CHP1, 2 go from high ("0") to low ("1") owing to the spindle changeover circuit 11, thereby driving the relay circuit 4. The latter turns off the electromagnetic contact MC1 and turns on the electromagnetic contact MC2 to switch over the spindle motor 2 from its low-speed winding to its high-speed winding. Thereafter, the enable signal ENB is turned on by a ROM changeover-complete signal *MRFIN and a power line changeover-complete signal CFIN, as a result of which the motor current is again supplied.

When the rotational speed of the spindle motor 2 subsequently declines again and falls below the set speed, the speed detection signal SDT reverts from on to off and the winding configuration of the spindle motor 2 assumes that of the low-speed winding in accordance with a sequence which is the reverse of that described above.

Figure 4:
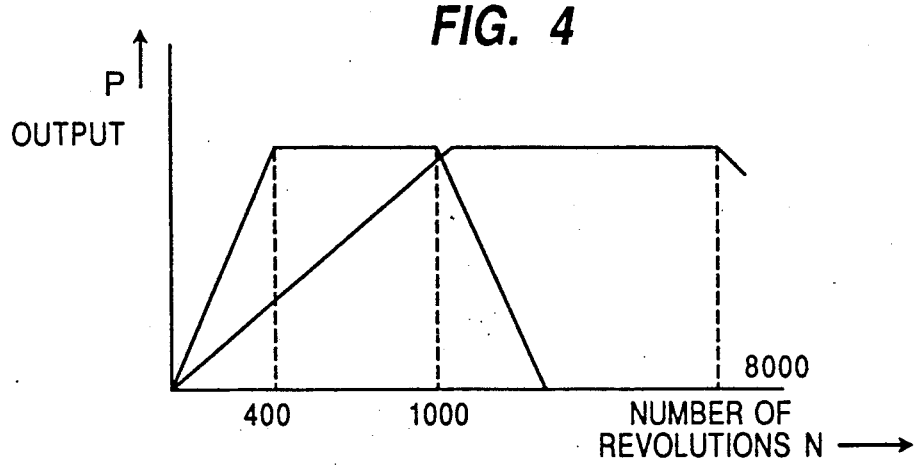
FIG. 4 is a characteristic diagram illustrating an example of output characteristics with respect to rotational speed.

FIG. 4 is a characteristic diagram illustrating an example of an output characteristic of the spindle motor 2 with respect to rotational speed. By way of example, assume that the number of revolutions N is 1000, this being the set speed, that N=400-1000 is the constant-output region by virtue of the low-speed winding, and that N=1000-8000 is the constant-speed region by virtue of the high-speed winding. In such case, constant output over a wide range can be realized by a single winding and without requiring a gear mechanism. In other words, the construction of the machine tool is simplified and there is a major advantage in terms of cost in comparison with the prior art. With regard to the set speed in this case, it is desirable to set a prescribed hysteresis between the time of acceleration and the time of deceleration in order to stabilize operation before and after the changeover speed.

Though an embodiment of the present invention has been described, the invention it not limited thereto but can be modified in various ways without departing from the scope of the claims.

Industrial Applicability

The motor output changeover control apparatus of the invention is advantageous in that a constant output over a wide range can be obtained by a single winding, thereby enabling construction of a spindle motor for a small-size machine tool.

We claim:

1. An apparatus for controlling changeover of an AC motor having a low-speed winding and a high-speed winding, said apparatus comprising:
   winding changeover means for changing over a power line connection of said AC motor;
   command means for issuing a power line changeover command to said winding changeover means based on a changeover request; and
   current limiting means for halting driving current to the power line based on the changeover request until changeover of signal patterns and changeover of the power line connection are completed.

2. An apparatus according to claim 1, further comprising memory means for storing more than one signal pattern for said AC motor.

3. An apparatus according to claim 2, further comprising:
   setting means for setting changeover speed; and
   control means for outputting the changeover request when the speed of said AC motor attains the changeover speed set by the setting means.

4. An apparatus according to claim 3, wherein the changeover speed is set to have hystereses between time of acceleration and time of deceleration.

5. An apparatus according to claim 1, wherein said winding changeover means includes a relay circuit and an electromagnetic contactor, a Y-connection winding forming the low-speed winding and a delta-connection winding forming the high-speed winding.

6. An apparatus according to claim 2, wherein said winding changeover means includes a relay circuit and an electromagnetic contactor, a Y-connection winding forming the low-speed winding and a delta-connection winding forming the high-speed winding.

7. An apparatus according to claim 3, wherein said winding changeover means includes a relay circuit and an electromagnetic contactor, a Y-connection winding forming the low-speed winding and a delta-connection winding forming the high-speed winding.

8. An apparatus according to claim 4, wherein said winding changeover means includes a relay circuit and an electromagnetic contactor, a Y-connection winding forming the low-speed winding and a delta-connection winding forming the high-speed winding.

9. An apparatus according to claim 2, wherein said memory means selectively supplies the signal patterns sorted in a main ROM and a subordinate ROM, the changeover of the signal patterns determining from where the signal patterns are supplied.

10. An apparatus for controlling changeover between at least high-speed and low-speed windings on an AC motor, said apparatus comprising:
    switch means for switching power connected to the windings on the AC motor;
    memory means for storing a plurality of signal patterns for controlling the AC motor;
    control means for commanding said switch means to switch power connected to the windings and for selecting one of the signal patterns to control the AC motor when the AC motor attains a predetermined speed; and
    wherein said control means halts the power to the AC motor when the AC motor attains the predetermined speed until power is switched by said switch means and one of the signal patterns is selected from said memory means.

11. An apparatus according to claim 10, wherein when the AC motor attains the predetermined speed, said control means commands said switch means and selects the signal pattern with hystereses between time of acceleration and time of deceleration.

12. An apparatus according to claim 11, wherein said memory means includes a plurality of read only memories each storing at least one signal pattern.

13. An apparatus according to claim 10, wherein said memory means includes a plurality of read only memories each storing at least one signal pattern.

14. An apparatus according to claim 10, wherein the windings includes a low-speed Y-winding and a high-speed delta-winding.

* * * * *

UNITED STATES PATENT AND TRADEMARK OFFICE
CERTIFICATE OF CORRECTION

PATENT NO. : 5,049,800

DATED : September 17, 1991

INVENTOR(S) : Kohari et al.

It is certified that error appears in the above-identified patent and that said Letters Patent is hereby corrected as shown below:

Item [57], under "ABSTRACT", line 1, after "The" insert --present--;

delete lines 2-11 in their entirety and substitute the following:

--control apparatus having output characteristics over a wide range from high to low speeds by changing over the connection of the power lines to windings of an AC motor. Power connected to the windings is switched when the AC motor attains a set speed. A new signal pattern to control the AC motor is selected from a plurality of read only memories when the AC motor attains the set speed. Upon changeover, power to the AC motor is halted until the windings are switched and a new signal pattern is chosen.--.

Col. 2, line 27, "(b)" should be --2(b)--;
line 29, "winding," should be --winding--.

Signed and Sealed this

Nineteenth Day of January, 1993

Attest:

DOUGLAS B. COMER

Attesting Officer

Acting Commissioner of Patents and Trademarks